(12) United States Patent
Tegström et al.

(10) Patent No.: US 10,604,287 B2
(45) Date of Patent: Mar. 31, 2020

(54) COIL PACKAGING SYSTEM

(71) Applicant: LAMIFLEX AB, Nyköping (SE)

(72) Inventors: Jonas Tegström, Linköping (SE); Patrik Toivonen, Nyköping (SE); Ulla Linna, Kempele (FI)

( * ) Notice: Subject to any disclaimer, the term of this patent is extended or adjusted under 35 U.S.C. 154(b) by 0 days.

(21) Appl. No.: 15/822,269

(22) Filed: Nov. 27, 2017

(65) Prior Publication Data

US 2018/0072441 A1 Mar. 15, 2018

Related U.S. Application Data

(63) Continuation of application No. PCT/SE2016/005051, filed on May 30, 2016.

(30) Foreign Application Priority Data

May 29, 2015 (SE) ...................................... 1550699

(51) Int. Cl.

| | |
|---|---|
| B25J 9/00 | (2006.01) |
| B25J 9/02 | (2006.01) |
| B25J 9/14 | (2006.01) |
| B25J 9/16 | (2006.01) |
| B25J 15/00 | (2006.01) |
| B65B 11/04 | (2006.01) |
| B65B 25/24 | (2006.01) |

(Continued)

(52) U.S. Cl.
CPC ............. *B65B 25/24* (2013.01); *B25J 9/0087* (2013.01); *B25J 9/023* (2013.01); *B25J 9/14* (2013.01); *B25J 9/144* (2013.01); *B25J 9/1682* (2013.01); *B25J 15/00* (2013.01); *B65B 11/04* (2013.01); *B65B 11/045* (2013.01); *B65B 41/04* (2013.01); *B65B 45/00* (2013.01); *B65B 65/02* (2013.01); *G05B 2219/45048* (2013.01)

(58) Field of Classification Search
CPC ......... B65B 25/24; B65B 27/06; B65B 11/04; H01F 41/08
USPC ....... 53/204, 409, 430, 113, 116; 242/435.5; 100/5, 12
See application file for complete search history.

(56) References Cited

U.S. PATENT DOCUMENTS

| | | | |
|---|---|---|---|
| 4,730,777 A | * | 3/1988 | Graul ...................... H01F 41/08 242/434.5 |
| 4,829,753 A | | 5/1989 | Bricmont |

(Continued)

FOREIGN PATENT DOCUMENTS

| | | |
|---|---|---|
| EP | 1253083 | 10/2002 |
| GB | 1014463 A | 12/1965 |

*Primary Examiner* — Robert F Long
*Assistant Examiner* — Patrick B Fry
(74) *Attorney, Agent, or Firm* — Gabriela B. Tomescu; Bergenstråhle & Partners AB

(57) ABSTRACT

Disclosed is a coil packaging system. The system comprises a first robot arm having a grappling portion adapted to grip a wrapping material, a second robot arm having a grappling portion adapted to grip the wrapping material, and a coil rotating means adapted to carry and rotate a coil about a coil axis. The first robot arm is movable along a first horizontal axis (A1) which, in an operating position, coincides with the coil axis, while the second robot arm is movable along a second horizontal axis (A2), the second horizontal axis (A2) being parallel to the first horizontal axis (A1), and along a third horizontal axis (A3), the third horizontal axis (A3) being perpendicular to the second horizontal axis (A2).

9 Claims, 3 Drawing Sheets

(51) Int. Cl.
*B65B 41/04* (2006.01)
*B65B 45/00* (2006.01)
*B65B 65/02* (2006.01)

(56) References Cited

U.S. PATENT DOCUMENTS

| | | | |
|---|---|---|---|
| 5,086,983 A * | 2/1992 | Darrieux | B65H 81/04 |
| | | | 242/434.5 |
| 5,573,200 A * | 11/1996 | Sato | G11B 5/17 |
| | | | 242/434.8 |
| 6,688,076 B1 * | 2/2004 | Rivera, Jr. | B65B 11/04 |
| | | | 53/204 |
| 6,705,060 B1 | 3/2004 | McGuinness et al. | |
| 8,695,318 B2 * | 4/2014 | Ogawa | B29D 30/48 |
| | | | 57/11 |
| 9,624,070 B2 * | 4/2017 | Yoshida | B65H 81/00 |

* cited by examiner

COIL PACKAGING SYSTEM

This application is the continuation of International Application No. PCT/SE2016/050501, filed 30 May 2016, which claims the benefit of Swedish Patent Application No. SE 1550699-1, filed 29 May 2015, the entire contents of which are hereby incorporated by reference.

TECHNICAL FIELD

The present invention relates generally to a coil packaging system for wrapping a coil with wrapping material, with a hand-over of wrapping material between two robotic arms.

BACKGROUND ART

Packing of sensitive goods by wrapping them with an impervious, stretchable wrapping medium, for example a stretch wrap plastic film, has been known for many years. When using this wrapping method the goods are protected against corrosion or soiling during transport and handling. Even large articles, such as coils of steel strip, are packaged with this method. However, packaging of coils of steel strip is particularly difficult due to their shape, size and weight. In order to fully wrap the coil still leaving an open center to receive coil handling equipment a method called through-the-eye wrapping has been developed.

Further, there are solutions available which discloses hand-over of a wrapping material between robotic arms. U.S. Pat. No. 6,705,060 describe such a system, comprising a pair of opposing robotic arms, which travel around both ends of a coil, handing off a roll of wrapping material back and forth above the coil and in the center of its hollow core, as the coil is slowly rotated by a variable-speed coil roller.

However, a system such as the one described in U.S. Pat. No. 6,705,060 is very large and heavy, partly because it comprises large devices for the robotic arms, and requires sensing systems for coordinating the robotic arms.

It would be desirable to achieve a solution which is smaller, cheaper and easier to implement.

SUMMARY OF INVENTION

It is an object of the solution to address at least some of the issues outlined above. It is possible to achieve these objects and others by using systems as defined in the attached claims.

According to one aspect, there is provided a coil packaging system. The system comprises a first robot arm having a grappling portion adapted to grip a wrapping material, a second robot arm having a grappling portion adapted to grip the wrapping material, and a coil rotating means adapted to carry and rotate a coil about a coil axis. The first robot arm is movable along a first horizontal axis which, in an operating position, coincides with the coil axis, and the second robot arm is movable along a second horizontal axis, the second horizontal axis being parallel to the first horizontal axis, and along a third horizontal axis, the third horizontal axis being perpendicular to the second axis. In an optional embodiment, the robot arms may further be adapted to pass the wrapping material between each other.

By implementing the system as describe above, an easier, simpler, cheaper, more cost-effective and more compact solution for wrapping coils than previously possible may be achieved. Furthermore, the system may be implemented using existing technology which further facilitates implementation of such a system.

In an optional embodiment the first grappling portion is adapted to grip a top part of the wrapping material, and the second grappling portion is adapted to grip a bottom part of the wrapping material.

In another optional embodiment, the second robot arm is extendable along the third axis and is mounted on a guide rail movable along the second axis.

In yet an optional embodiment, the first and second robot arms are adapted to move simultaneously along the first and second horizontal axes. By having the robot arms move parallel to one another there is no need for a sensing and/or coordinating system to keep them properly aligned with each other during operation.

In another optional embodiment the first robot arm is arranged at a first height and the second robot arm is arranged at a second height, wherein the distance between the first and the second height is substantially the same as the height of the wrapping material. This may further decrease the need for coordinating and moving the system during operation, as it may be pre-configured for specific heights of coils and wrapping materials.

In an optional embodiment the robot arms are adjustable along a vertical axis. The coil rotating means may also be adjustable along a vertical axis. This enables the system to accommodate coils of various sizes and shapes, since the first robot arm should be roughly aligned with the eye of the coil during operating.

According to one aspect, there is provided a coil packaging system. The system comprises a first robot arm having a grappling portion adapted to grip a wrapping material, a second robot arm having a grappling portion adapted to grip the wrapping material, and a coil rotating means adapted to carry and rotate a coil about a coil axis. The first robot arm is only movable along a first horizontal axis which, in an operating position, coincides with the coil axis, and the second robot arm is movable along a second horizontal axis, the second horizontal axis being parallel to the first horizontal axis, and along a third horizontal axis, the third horizontal axis being perpendicular to the second axis. In an optional embodiment, the robot arms may further be adapted to pass the wrapping material between each other.

According to one aspect, there is provided a coil packaging system. The system comprises a first robot arm having a grappling portion adapted to grip a wrapping material, a second robot arm having a grappling portion adapted to grip the wrapping material, and a coil rotating means adapted to carry and rotate a coil about a coil axis. The first robot arm is only movable along a first horizontal axis which, in an operating position, coincides with the coil axis, and wherein the first robot arm is adapted to move through the eye of the coil, and the second robot arm is movable along a second horizontal axis, the second horizontal axis being parallel to the first horizontal axis, and along a third horizontal axis, the third horizontal axis being perpendicular to the second axis. In an optional embodiment, the robot arms may further be adapted to pass the wrapping material between each other.

According to one aspect, there is provided a coil packaging system. The system comprises a first robot arm having a grappling portion adapted to grip a wrapping material, a second robot arm having a grappling portion adapted to grip the wrapping material, and a coil rotating means adapted to carry and rotate a coil about a coil axis. The first robot arm is only movable along a first horizontal axis in a process of wrapping the coil, which, in an operating position, coincides with the coil axis, and the second robot arm is movable along a second horizontal axis, the second horizontal axis being parallel to the first horizontal axis, and along a third horizontal axis, the third horizontal axis being perpendicular to the second axis. In an optional embodiment, the robot arms may further be adapted to pass the wrapping material between each other.

According to one aspect, there is provided a coil packaging system. The system comprises a first robot arm having a grappling portion adapted to grip a wrapping material, a second robot arm having a grappling portion adapted to grip the wrapping material, and a coil rotating means adapted to carry and rotate a coil about a coil axis. The first robot arm is only movable along a first horizontal axis in a process of wrapping the coil, which, in an operating position, coincides with the coil axis, and wherein the first robot arm is adapted to move through the eye of the coil, and the second robot arm is movable along a second horizontal axis, the second horizontal axis being parallel to the first horizontal axis, and along a third horizontal axis, the third horizontal axis being perpendicular to the second axis. In an optional embodiment, the robot arms may further be adapted to pass the wrapping material between each other.

The above system may be configured and implemented according to other optional embodiments. Further possible features and benefits of this solution will become apparent from the detailed description below.

BRIEF DESCRIPTION OF DRAWINGS

The invention is now described, by way of example, with reference to the accompanying drawings, in which.

DESCRIPTION OF EMBODIMENTS

In the following, a detailed description of the coil packaging system is disclosed. All examples herein should be seen as part of the general description and therefore possible to combine in any way in general terms. Again, individual features of the various embodiments may be combined or exchanged unless such combination or exchange is clearly contradictory to the overall function of the system.

Figure 1:
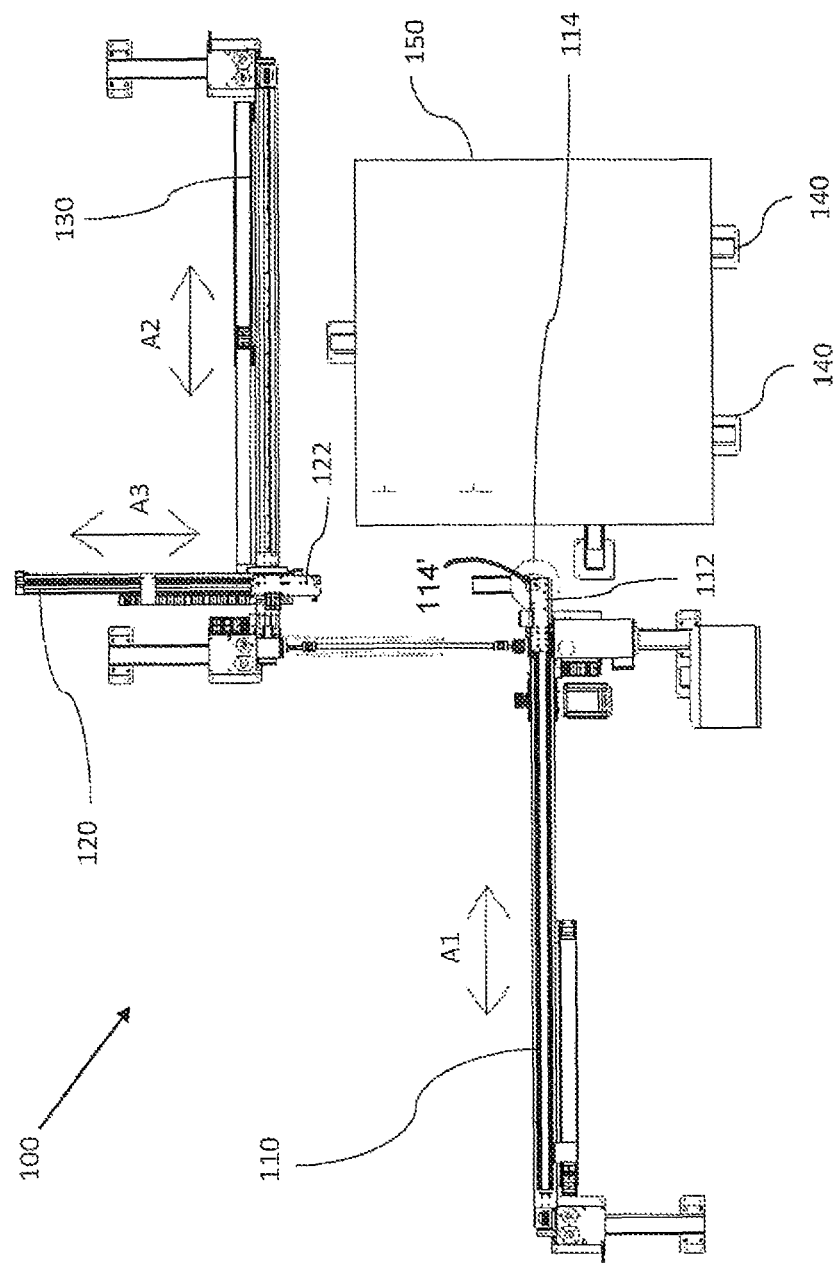
FIG. 1 discloses a top view of a coil packaging system in an operational position.

FIG. 1 shows a top view of a system 100 for packaging coils according to the present disclosure in an operational position. The system comprises a first robot arm 110, which is movable along a first horizontal axis A1, and a second robot arm 120, which is movable along a second horizontal axis A2. The second horizontal axis A2 is parallel to the first horizontal axis A1, and the second robot arm 120 is also movable along a third horizontal axis A3, which is perpendicular to the first and second horizontal axes A1 and A2. The system 100 further comprises a coil rotating means 140, adapted to carry and rotate a coil 150 about a coil axis A1, wherein the coil axis A1 is the same as the first horizontal axis A1 along which the first robot arm 110 is movable.

The first robot arm 110 and the second robot arm 120 are both adapted to grip and carry a wrapping material 114. In a typical embodiment, the first robot arm comprises a grappling portion 112 and the second robot arm comprises a grappling portion 122, where the two grappling portions are similarly adapted to grip and carry a wrapping material. However, in some embodiments the height of the grappling portions 112, 122 are adapted to grip the wrapping material 114 at different heights, for instance the first grappling portion 112 of the first robot arm 110 may be adapted to grip a bottom portion 114" (shown in FIG. 2) of the wrapping material 114 while the second grappling portion 122 of the second robot arm 120 may be adapted to grip a top portion 114' (shown both in FIG. 1 and FIG. 2) of the wrapping material 114. By adapting the grappling portions 112, 122 of the robot arms 110, 120 as described above, the first robot arm 110 and the second robot arm 120 may more easily pass the wrapping material 114 between one another, as compared to a solution wherein the grappling portions 112, 122 are adapted to grip the same part of the wrapping material 114. The grappling portions 112, 122 may be implemented in various ways as will be understood by a skilled person, for instance each grappling portion may comprise two grappling arms which are adapted to grip the wrapping material on one side each, and the wrapping material may have handles adapted to be gripped by the grappling portions.

The first robot arm 110 is typically only movable in one direction, which is along the first horizontal axis A1. According to one embodiment, the first robot arm 110 is only movable or adapted to move in one direction in or during a process of wrapping the coil, along the first horizontal axis A1. According to one embodiment, the first robot arm 110 is only movable or adapted to move in one direction, during operation or during operation of wrapping the coil, along the first horizontal axis A1. Thus, it is understood that the first robot arm 110 may be adapted to move in a plurality of directions, however for the purpose of carrying out the process of, or during operation of wrapping the coil, the first robot arm 110 is only moving or is movable or adapted to move in one direction which is along the first horizontal axis A1. The second robot arm 120 is movable in two directions, wherein the second direction is perpendicular to the first direction, meaning that the second robot arm is movable along the second horizontal axis A2 which is parallel to the first horizontal axis A1, as well as along the third horizontal axis A3 which is perpendicular to the first and second horizontal axes A1, A2. By implementing the system 100 with two robot arms movable as described above, it is possible to achieve a system which is simple while still achieving the desired functionality of being able to completely cover a coil 150 with wrapping material, including the eye of the coil 150. In order to cover the coil, the wrapping system must be able to move around a coil, i.e. to move in at least four directions along two axes, and an easy way to implement such functionality is by a system according to the present disclosure.

The robot arms are further adapted to pass the wrapping material 114 between one another, in order to be able to completely cover a coil 150 with wrapping material 114. The first robot arm 110 is adapted to pass the wrapping material to the second robot arm 120, and the second robot arm 120 is likewise adapted to pass the wrapping material to the first robot arm 110, so that the wrapping material 114 may be passed around the entirety of the coil 150, as well as through the eye of the coil 150. The first robot arm 110 is movable along the first horizontal axis A1, which is also the axis of the coil 150, and therefore the first robot arm 110 is adapted to move through the eye of the coil 150. The second robot arm 120 is adapted to give the wrapping material 114 to the first robot arm 110 before the first robot arm 110 moves through the eye of the coil 150, and is also adapted to receive the wrapping material 114 from the first robot arm 110 after it has moved through the eye of the coil 150. Since the first 110 and second 120 robot arms are similarly adapted with grappling portions, there is virtually no difference between the first arm 110 giving the wrapping material and the second arm 120 receiving it, and the second arm 120 giving the wrapping material 114 and the first arm 110 receiving it.

In some implementations, the first robot arm 110 and the second robot arm 120 are adapted to move parallel to each other. This removes the need for a system for coordinating the arms with one another, since the movements will always be coordinated along the parallel axes A1 and A2.

Figure 2:
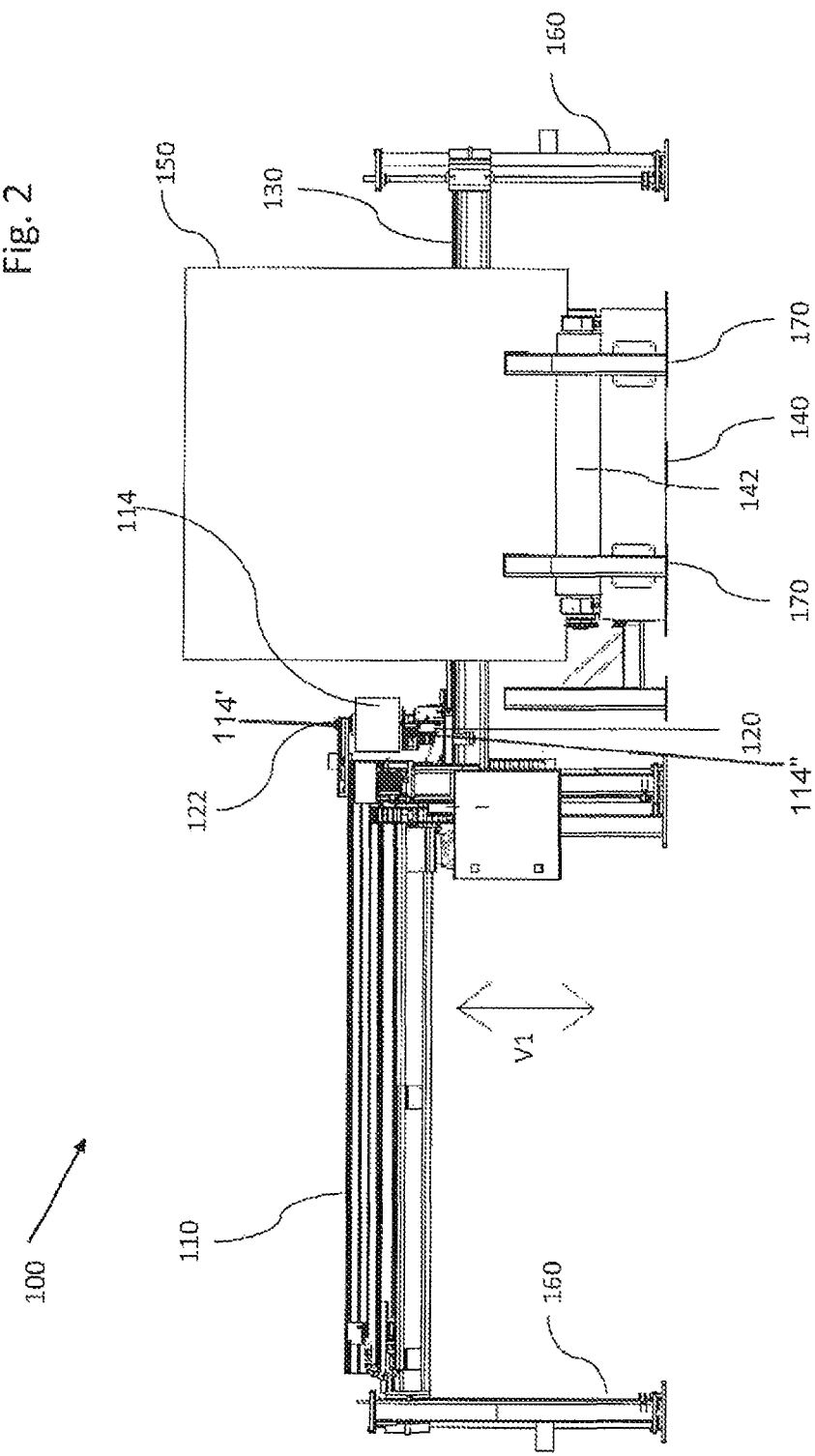
FIG. 2 discloses a side view of the coil packaging system of FIG. 1 in the operational position.

FIG. 2 shows a side view of the system of FIG. 1. As can be seen from the figure, the first robot arm 110 and the second robot arm 120 may be mounted at different heights relative to the ground. This is for facilitating the hand-over of the wrapping material 114 in an embodiment wherein the first arm 110 grips the wrapping material at a top side, and the second arm 120 grips the material at a bottom side.

The coil rotating means 140 are adapted to carry and rotate a coil 150. The rotating means 140 must be sturdy enough to handle the weight of a coil 150 which may be very heavy. The rotating means 140 may comprise two rollers 142 which are rotatable in order to rotate the coil 150. However, in some embodiments the rotating means 140 may be differently arranged while still achieving the same purpose, for instance they may comprise a bottom part adapted to carry the coil and have two rollers disposed at a top side of the coil 150 adapted to rotate the coil.

Furthermore, the first 110 and/or second 120 robot arm may be vertically adjustable in order for the system to handle coils of various sizes and shapes. Since at least one of the robot arms 110 is adapted to transport the wrapping material 114 through the eye of the coil 150, vertical adjustability between the arms 110, 120 and the coil 150 is required. This may be achieved by having at least one of the robot arms mounted on vertically adjustable rails 160, which may be for instance pneumatically operated. In some embodiments, the coil rotating means 140 may be adapted to be vertically adjustable instead of the robot arms, for instance by being mounted on vertically adjustable rails 170, for achieving the same functionality. Furthermore, both the robot arms 110, 120 and the coil rotating means 140 may be vertically adjustable.

Figure 3:
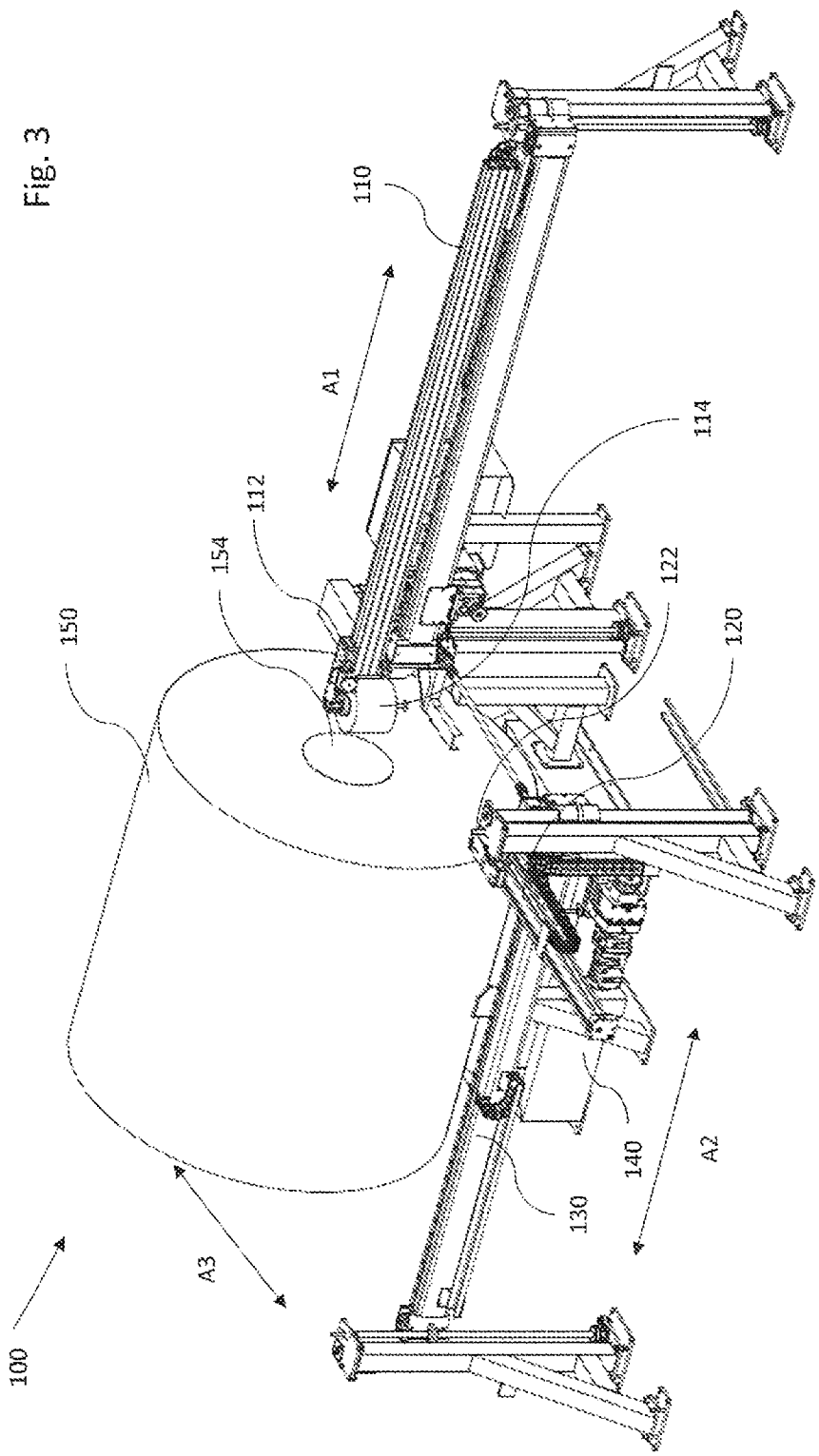
FIG. 3 discloses a perspective side view of the coil packaging system of FIG. 1 in the operational position.

Looking now at FIG. 3, a three-dimensional side view of the system is shown, which exemplifies the positioning of the robot arms 110, 120, the coil 150 and the wrapping material 114, before the robot arm 110 is about to move through the eye 154 of the coil 150.

An exemplifying process of wrapping a coil 150 with a system according to the present disclosure will now be described with reference to FIG. 3. The robot arm 110 is in the figure holding the wrapping material 114 by using the grappling portion 112, and this position will be referred to as the starting position for the purpose of this explanation, even though the system may have any number of different starting positions. The robot arm 110 will extend through the eye 154 of the coil 150, by moving the robot arm 110 along the first horizontal axis A1, in order to pass the wrapping material 114 through the eye 154 of the coil 150 and thereby wrap the inside of the coil 150 with wrapping material 114. When the first robot arm 110 has moved through the eye 154 of the coil 150 and emerges on the other side of the coil 150, the wrapping material will be passed over to the second robot arm 120. In some embodiments, the second robot arm 120 will move parallel to the first robot arm 110 on a guide rail 130 along the second horizontal axis A2, but it is also possible that the robot arms move independently of each other.

When passing the material from the first robot arm 110 to the second robot arm 120, it is the second robot arm 120 that moves towards the first robot arm 110 along the third horizontal axis A3, and subsequently grips the wrapping material 114 by use of the grappling portion 122. Since the second robot arm 120 is the one movable along two axes, it needs to be the second robot arm 120 that moves towards the first robot arm 110 rather than the other way around. After the second robot arm 120 has taken the wrapping material 114 from the first robot arm, the second robot arm moves back to the same position along the third axis A3 as it was in the starting position. When moving back, the second robot arm 120 will transport the wrapping material that is being held by the grappling portion 122, which will cover the left side of the coil 150. Then, the second robot arm 120, which is still holding the wrapping material 114, will move towards its starting position along the second horizontal axis A2, thereby wrapping the front side of the coil 150. When back in the starting position, the second robot arm 120 will once again extend outward along the third horizontal axis A3 in order to pass the wrapping material 114 back to the first robot arm 110, thereby wrapping the right side of the coil. The second robot arm is extendable along the third axis (A3) and is mounted on a guide rail (130) movable along the second axis (A2).

As can be understood, the procedure described above only covers one side of the coil 150 in the case the coil 150 is stationary. In order to achieve the wrapping of the whole coil 150, the coil rotating means 140 are typically rotating during the whole procedure described above, which will enable the whole coil 150 to be covered with wrapping material 114. In some implementations the coil is slowly rotating the whole time, while in other implementations the coil rotating means 140 may be adapted to rotate the coil a predetermined amount after each repetition of a cycle as described above. It will be understood that the above cycle has to be reiterated multiple times in order to cover the entire coil 150 with wrapping material 114.

The robot arms of the present disclosure are typically pneumatically, mechanically or electrically driven, but it will be understood that other driving mechanisms are possible.

By implementing a system as described in the present disclosure, a simpler and cheaper system which is also easier to implement and operate, when compared with existing solutions, may be achieved.

A preferred embodiment of a coil packaging system, according to the invention has been described. However, the person skilled in the art realizes that this can be varied within the scope of the appended claims without departing from the inventive idea.

All the described alternative embodiments above or parts of an embodiment, can be freely combined without departing from the inventive idea as long as the combination is not contradictory.

The invention claimed is:
1. A coil packaging system comprising:
a first robot arm having a grappling portion adapted to grip a wrapping material;
a second robot arm having a grappling portion adapted to grip the wrapping material;
a coil rotating means adapted to carry and rotate a coil about a coil axis;
wherein the first robot arm is only movable along a first horizontal axis during a process of wrapping the coil wherein, when the coil is in an operating position, the first horizontal axis coincides with the coil axis; and
wherein the first robot arm is adapted to move through the eye of the coil, and wherein the second robot arm is movable along a second horizontal axis, the second horizontal axis being parallel to but different from the first horizontal axis, and wherein the second robot arm is further movable towards and away from the first robot arm along a third horizontal axis to pass the wrapping material between the robot arms, the third horizontal axis being perpendicular to the second horizontal axis.

2. The coil packaging system according to claim 1, wherein the grappling portion of the first robot arm is adapted to grip a top part of the wrapping material, and the grappling portion of the second robot arm is adapted to grip a bottom part of the wrapping material.

3. The coil packaging system according to claim 1, wherein the second robot arm is adapted to extend along the third axis and is mounted on a guide rail, wherein the guide rail is oriented along the second axis.

4. The coil packaging system according to claim 1, wherein the first and second robot arms are adapted to move simultaneously along the first and second horizontal axes.

5. The coil packaging system according to claim 1, wherein the first robot arm is arranged at a first height and the second robot arm is arranged at a second height, wherein the distance between the first and the second height is substantially the same as the height of the wrapping material.

6. The coil packaging system according to claim 1, wherein the robot arms are adjustable along a vertical axis.

7. The coil packaging system according to claim 1, wherein the coil rotating means are vertically adjustable.

8. The coil packaging system according to claim 1, wherein the robot arms are pneumatically driven.

9. A coil packaging system comprising:
   a first robot arm having a grappling portion adapted to grip a wrapping material;
   a second robot arm having a grappling portion adapted to grip the wrapping material;
   a coil rotating means adapted to carry and rotate a coil about a coil axis;
   wherein,
   the first robot arm is only movable along a first horizontal axis wherein, when the coil is in an operating position, the first horizontal axis coincides with the coil axis; and
   the second robot arm is movable along a second horizontal axis,
   the second horizontal axis being parallel to but different from the first horizontal axis, and
   wherein the second robot arm is further movable towards and away from the first robot arm along a third horizontal axis to pass the wrapping material between the robot arms, the third horizontal axis being perpendicular to the second horizontal axis.

* * * * *